(12) United States Patent
Schiffer et al.

(10) Patent No.: US 10,691,876 B2
(45) Date of Patent: Jun. 23, 2020

(54) NETWORKING IN A SOCIAL NETWORK

(71) Applicant: ADP, LLC, Roseland, NJ (US)

(72) Inventors: Jordan Schiffer, Brooklyn, NY (US); Hadar Yocobovitz, New York, NY (US); Gregory Peter Kavanagh, New York, NY (US); Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 150 days.

(21) Appl. No.: 14/677,248

(22) Filed: Apr. 2, 2015

(65) Prior Publication Data

US 2016/0028803 A1 Jan. 28, 2016

Related U.S. Application Data

(60) Provisional application No. 62/029,910, filed on Jul. 28, 2014.

(51) Int. Cl.
| | | |
|---|---|---|
| *H04L 29/08* | (2006.01) | |
| *G06F 40/166* | (2020.01) | |
| *G06F 40/106* | (2020.01) | |
| *G06Q 10/06* | (2012.01) | |
| *G06T 11/20* | (2006.01) | |
| *G06T 11/60* | (2006.01) | |
| *G06K 9/00* | (2006.01) | |
| *G06K 9/62* | (2006.01) | |

(52) U.S. Cl.
CPC .......... *G06F 40/166* (2020.01); *G06F 40/106* (2020.01); *G06K 9/00288* (2013.01); *G06K 9/6201* (2013.01); *G06Q 10/06* (2013.01); *G06T 11/206* (2013.01); *G06T 11/60* (2013.01); *H04L 67/1053* (2013.01); *H04L 67/22* (2013.01); *H04L 67/306* (2013.01)

(58) Field of Classification Search
CPC .. G06F 17/30601; G06F 17/24; G06F 17/212; G06K 9/00288; G06K 9/6201; H04L 67/306; H04L 67/22; H04L 67/1053; G06Q 10/06; G06T 11/206; G06T 11/60
See application file for complete search history.

(56) References Cited

U.S. PATENT DOCUMENTS

| 5,485,556 A | 1/1996 | Takagi et al. |
| 5,835,880 A | 11/1998 | Gan et al. |
| 7,209,261 B2 | 4/2007 | Krueger et al. |
| (Continued) | | |

OTHER PUBLICATIONS

Schiffer et al., "Profile Generator," U.S. Appl. No. 14/677,198, filed Apr. 2, 2015, 51 pages.

(Continued)

*Primary Examiner* — Shean Tokuta
*Assistant Examiner* — Juan C Turriate Gastulo
(74) *Attorney, Agent, or Firm* — Yee & Associates, P.C.

(57) ABSTRACT

A method and apparatus for facilitating networking in a social network. A computer system identifies a group of features in an image for a person in the social network. The computer system also identifies a characteristic for networking from the group of features. Further, the computer system identifies a set of people in the social network having the characteristic. The computer system also performs an action enabling networking in the social network with respect to the person and the set of people in the social network having the characteristic.

23 Claims, 8 Drawing Sheets

(56) References Cited

U.S. PATENT DOCUMENTS

| | | | |
|---|---|---|---|
| 8,457,392 B2 | 6/2013 | Cavallaro et al. | |
| 8,792,125 B2 | 7/2014 | Polit et al. | |
| 8,913,085 B2 | 12/2014 | Anderson et al. | |
| 9,264,437 B1 | 2/2016 | Tran et al. | |
| 9,317,736 B1* | 4/2016 | Siddiqui | H04M 1/274508 |
| 9,374,399 B1* | 6/2016 | Lin | G06Q 30/02 |
| 9,531,823 B1* | 12/2016 | Suchland | H04W 4/023 |
| 2009/0144154 A1 | 6/2009 | Schein | |
| 2011/0182482 A1* | 7/2011 | Winters | G06K 9/00288 |
| | | | 382/116 |
| 2011/0268331 A1 | 11/2011 | Binning et al. | |
| 2012/0054691 A1* | 3/2012 | Nurmi | G06Q 10/10 |
| | | | 715/854 |
| 2012/0239506 A1 | 9/2012 | Saunders et al. | |
| 2013/0030987 A1 | 1/2013 | Zuckerberg et al. | |
| 2013/0114864 A1* | 5/2013 | Garcia | H04N 7/173 |
| | | | 382/118 |
| 2013/0191372 A1 | 7/2013 | Lee et al. | |
| 2013/0251201 A1* | 9/2013 | Zhou | G06K 9/00228 |
| | | | 382/103 |
| 2013/0262588 A1 | 10/2013 | Barak et al. | |
| 2013/0290414 A1* | 10/2013 | Rait | G06Q 50/01 |
| | | | 709/204 |
| 2013/0332832 A1* | 12/2013 | Lin | H04N 21/4788 |
| | | | 715/719 |
| 2014/0019264 A1* | 1/2014 | Wachman | G06Q 30/0276 |
| | | | 705/14.72 |
| 2014/0229479 A1 | 8/2014 | Sharafi et al. | |
| 2015/0081725 A1* | 3/2015 | Ogawa | G06Q 50/01 |
| | | | 707/754 |
| 2015/0104082 A1 | 4/2015 | Kim et al. | |
| 2016/0004778 A1* | 1/2016 | Finder | G06F 16/9535 |
| | | | 707/722 |
| 2016/0148298 A1 | 5/2016 | Tang et al. | |
| 2016/0224871 A1* | 8/2016 | Koren | G06K 9/00288 |

OTHER PUBLICATIONS

Office Action, dated Mar. 31, 2017, regarding U.S. Appl. No. 14/677,198, 23 pages.

Final Office Action, dated Jul. 14, 2017, regarding U.S. Appl. No. 14/677,198, 16 pages.

Final Office Action, dated Feb. 11, 2019, regarding U.S. Appl. No. 14/677,198, 22 pages.

Office Action, dated Jan. 7, 2020, regarding U.S. Appl. No. 14/677,198, 13 pages.

\* cited by examiner

NETWORKING IN A SOCIAL NETWORK

This application claims the benefit of U.S. Provisional Patent Application Ser. No. 62/029,910, filed Jul. 28, 2014, and entitled "Dynamic User Interface."

BACKGROUND INFORMATION

1. Field

The present disclosure relates generally to an improved computer system, and in particular, to a method and apparatus for facilitating networking. Still more particularly, the present disclosure relates to a method and apparatus for facilitating networking in a social network.

2. Background

Social networks provide a platform for people to build networks. These networks may include people who share interests, activities, backgrounds, work, or real life connections. The social networks may be used for personal or business reasons. A social network used for business reasons is a professional network. These social networks include information about people located on computers on a network such as the Internet.

A professional network provides people with a way to perform networking, share ideas, find resources for projects, find jobs, hire people, obtain information, and other suitable activities. A professional network may be within an organization or may extend broadly across the Internet.

People may form connections to other people in a number of different ways. For example, a person may form connections with other people that the person already knows. As another example, a person may search the social network for people and establish connections based on who they find. For example, a person may search for people who work at the same company or have similar work interests. The search also may include finding other people based on colleges attended, education, experience, skills, locations, business goals, and other factors.

For example, when a person looks for a new connection, that person may review profile pages of people returned in searches to determine whether to request a connection. Other people may also review the profiles of the person requesting a connection in determining whether to accept a request for a connection.

The profile page may be generated by a person entering information. For example, the person creating a profile page enters information such as work history, schools attended, degrees received, skills, interests, and other information about the person.

The profile page, however, may be incomplete. For example, a position at a prior company, an interest in a sport, involvement in charity, or some other information may be missing from the profile page. As a result, reviewing the profile page does not show this information about a person for purposes of deciding whether to request a connection, send a message, or perform some other action to establish contacts in a social network.

Therefore, it would be desirable to have a method and apparatus that take into account at least some of the issues discussed above, as well as other possible issues. For example, it would be desirable to have a method and apparatus that overcome the technical problem of insufficient information in a profile of a person in a social network reducing the ability to establish contacts in the social network.

SUMMARY

An embodiment of the present disclosure provides a method for facilitating networking in a social network. A computer system identifies a group of features in an image for a person in the social network. The computer system further identifies a characteristic for networking from the group of features. The computer system still further identifies a set of people in the social network having the characteristic. The computer system performs an action enabling networking in the social network with respect to the person and the set of people in the social network having the characteristic.

Another embodiment of the present disclosure provides a computer system. The computer system comprises a network facilitator that identifies a group of features in an image for a person in a social network. The network facilitator further identifies a characteristic for networking from the group of features. The network facilitator still further identifies a set of people in the social network having the characteristic. The network facilitator performs an action enabling networking in the social network with respect to the person and the set of people in the social network having the characteristic.

Yet another embodiment of the present disclosure provides a computer program product for facilitating networking. The computer program product comprises a computer readable storage media, and first program code, second program code, third program code, and fourth program code stored on the computer readable storage media. The first program code identifies a group of features in an image for a person in a social network. The second program code identifies a characteristic for networking from the group of features. The third program code identifies a set of people in the social network having the characteristic. The fourth program code performs an action enabling networking in the social network with respect to the person and the set of people in the social network having the characteristic.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently used mechanisms for suggesting connections rely on information in the profile page. The illustrative embodiments recognize and take into account that when information useful for identifying networking opportunities is missing from the profile page, the ability to establish contacts in a social network is reduced.

The illustrative embodiments recognize and take into account that information about a person may be obtained from other sources other than textual information entered by a person to create a profile page. For example, a person may upload images. The illustrative embodiments recognize and take into account that images may provide additional information about the person not found in the text information on the profile page. However, these images are not always looked at when searching for information in the social network.

The illustrative embodiments recognize and take into account that the image may be processed to identify information about the person that may be used for establishing contacts. Thus, the illustrative embodiments provide a method and apparatus for facilitating network connections. In one illustrative example, a computer system identifies a group of features in an image for a person in a social network. The computer system identifies a characteristic for networking from the group of features. The computer system identifies a set of people in the social network having the characteristic. The computer system performs an action enabling networking in the social network with respect to the person and the set of people in the social network having the characteristic.

Figure 1:
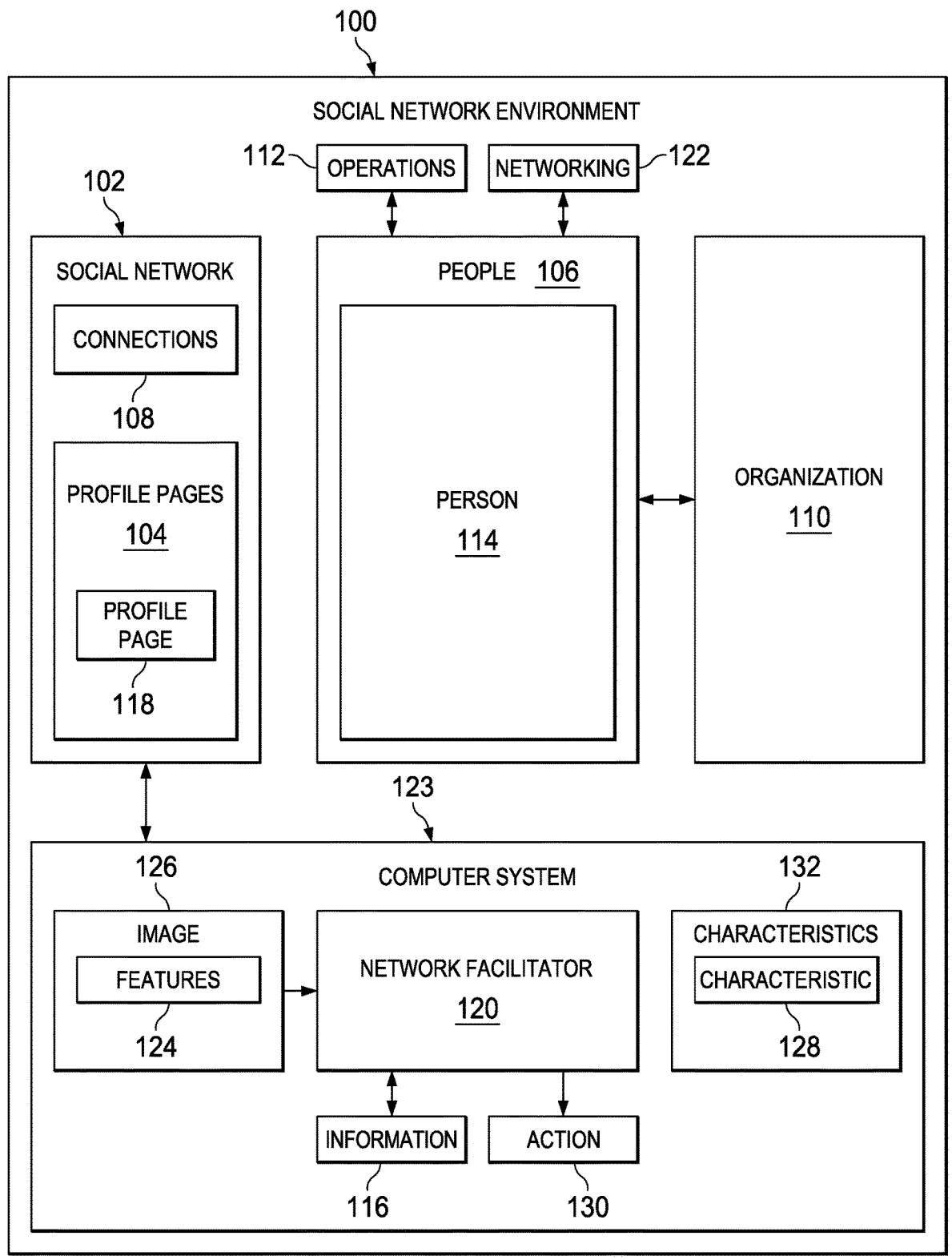
FIG. 1 is an illustration of a block diagram of a social networking environment in accordance with an illustrative embodiment.

With reference to the figures, and in particular, with reference to FIG. 1, an illustration of a block diagram of a social networking environment is depicted in accordance with an illustrative embodiment. In this example, social network environment 100 is an environment in which social network 102 has profile pages 104 for people 106.

People 106 establish connections 108 in social network 102. In one illustrative example, people 106 may be part of organization 110. Organization 110 may take various forms. For example, organization 110 may be a company, a charity, a government entity, an educational group, a social group, a team, or some other suitable organization.

Social network 102 may be used by people 106 within organization 110 to perform operations 112. For example, operations 112 may include at least one of networking, setting up teams, assigning tasks, creating departments, generating business plans, generating organizational charts, obtaining information, or other operations that may be performed by people 106 in organization 110.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For example, person 114 in people 106 may view profile pages 104 to identify people 106 with which they want to establish connections. Person 114 may view profile pages 104 to obtain information about people 106. For example, person 114 may read text in profile pages 104 to obtain information about people 106. This information may be used to perform operations 112. Additionally, person 114 may establish connections 108 to form a network for performing operations 112.

For example, profile pages 104 may not include information 116 that may be used for establishing connections 108 between people 106. In one illustrative example, information 116 may be absent from profile page 118 in profile pages 104 because profile page 118 is incomplete. In another illustrative example, the design or structure of profile page 118 may not allow for information 116 to be included even though information 116 may be useful in establishing connections 108.

In this illustrative example, network facilitator 120 helps facilitate networking 122 between people 106 in social network 102. Network facilitator 120 may be implemented in computer system 123.

For example, network facilitator 120 may help in establishing connections 108 between people 106 in social network 102. As another example, network facilitator 120 may also help people 106 meet each other in person as well as through social network 102.

In operation, network facilitator 120 identifies a group of features 124 in image 126 for person 114 in social network 102. As depicted, image 126 is selected from one of a profile picture, a background picture, or some other suitable type of image.

Image 126 may be a photograph, a computer-generated picture, or some other type of image. In this illustrative example, the group of features 124 is selected from at least one of a person, a face of a person, a car, a stadium, a building, an animal, a piece of equipment, a piece of apparel, a piece of furniture, an aircraft, a tree, a mountain, a spacecraft, a planet, an object, a symbol, a logo, or some other feature that may present in image 126.

In this illustrative example, network facilitator 120 also identifies characteristic 128 for networking 122 from the group of features 124. As used herein, a "group of," when used with reference to items, means one or more items. For example, a group of features 124 is one or more features 124.

In the illustrative example, a single feature in the group of features 124 may be used to identify characteristic 128. In another illustrative example, two or more features in the group of features 124 may be used to identify characteristic 128. In other words, a one-to-one correspondence between features and characteristics may not be present.

In this illustrative example, characteristic 128 is any information about person 114 that may be used for networking 122. For example, characteristic 128 may be selected from one of a prior job, a prior position, a current position, a current job, a current company, a prior company, a hobby, a favorite sports team, a skill, a college attended, a degree obtained, an interest, books read, or some other suitable characteristic about person 114.

Network facilitator 120 identifies a set of people 106 in social network 102 having characteristic 128. Network facilitator 120 performs action 130, enabling networking 122 in social network 102 with respect to person 114 and set of people 106 in social network 102 having characteristic 128. In this manner, network facilitator 120 may identify a set of people 106 having interests, backgrounds, common experiences, or other characteristics that may prompt a desire for networking 122.

Also, a "set of," when used with reference to items, means zero or more items. In other words, the set of items may be a novel set in some cases in which nothing is present in the set. For example, the set of people 106 may be zero or more of people 106.

This identification may be performed with more than one characteristic. For example, network facilitator 120 may identify a number of characteristics 132 in addition to characteristic 128 in characteristics 132. As used herein, "a number of," when used with reference to items, means one or more items. Characteristic 128 and the number of characteristics 132 are a plurality of characteristics 132 in this illustrative example.

In this illustrative example, the identifying of the set of people 106 having characteristic 128 may comprise identifying the set of people 106 in social network 102 having the plurality of characteristics 132. In this example, action 130 is performed for the set of people 106 having the plurality of characteristics 132 matching those of person 114.

As depicted, action 130 may take various forms. For example, action 130 may include sending a suggestion to the set of people 106 to establish a connection with person 114. In another illustrative example, action 130 may include selecting a team based on person 114 and the set of people 106. In still another illustrative example, action 130 may involve sending a message to the set of people 106 indicating that person 114 is in social network 102 and has characteristic 128 or a plurality of characteristics 132 in common with the set of people 106.

Network facilitator 120 may be implemented in software, hardware, firmware, or a combination thereof. When software is used, the operations performed by network facilitator 120 may be implemented in program code configured to run on hardware, such as a processor unit. When firmware is used, the operations performed by network facilitator 120 may be implemented in program code and data and stored in persistent memory to run on a processor unit. When hardware is employed, the hardware may include circuits that operate to perform the operations in network facilitator 120.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 123 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As a result, computer system 123 operates as a special purpose computer system in which network facilitator 120 in computer system 123 enables identifying information 116 that may be used to perform networking 122 within social network 102. For example, network facilitator 120 may operate to identify information 116, and perform action 130 that allows for connections 108 to be made between person 114 and a set of people 106. In particular, network facilitator 120 transforms computer system 123 into a special purpose computer system as compared to currently available general computer systems that do not have network facilitator 120.

With network facilitator 120, networking 122 may occur more efficiently between people 106 in social network 102. In the illustrative example, network facilitator 120 identifies information 116 about person 114 or others in people 106 that may not be easily identified or found in profile pages 104.

For example, information 116 may include information in images. The illustrative embodiments recognize and take into account that people 106 searching for information 116 may perform text searches. Information 116 in images do not show up in these types of searches.

Network facilitator 120 performs action 130 in a manner that solves the technical problem of insufficient information in a profile of a person in a social network reducing the ability to establish contacts in the social network. As described above, the insufficient information may be information 116 that is absent from profile pages 104. In particular, information 116 may be text describing people 106.

Thus, network facilitator 120 in computer system 123 provides a technical solution to the technical problem with insufficient information being present in profile pages 104 in social network 102. In this manner, the technical solution has a technical effect of enabling networking in social network 102 with respect to person 114 and the set of people 106 in social network 102 having characteristic 128.

In the illustrative example, network facilitator 120 may be especially useful for networking 122 for people 106 in organization 110. For example, if person 114 is new to organization 110, identifying a set of people 106 having characteristic 128 in common with person 114 may be used to provide opportunities for networking 122. In this manner, person 114 may integrate more quickly into organization 110.

Figure 2:
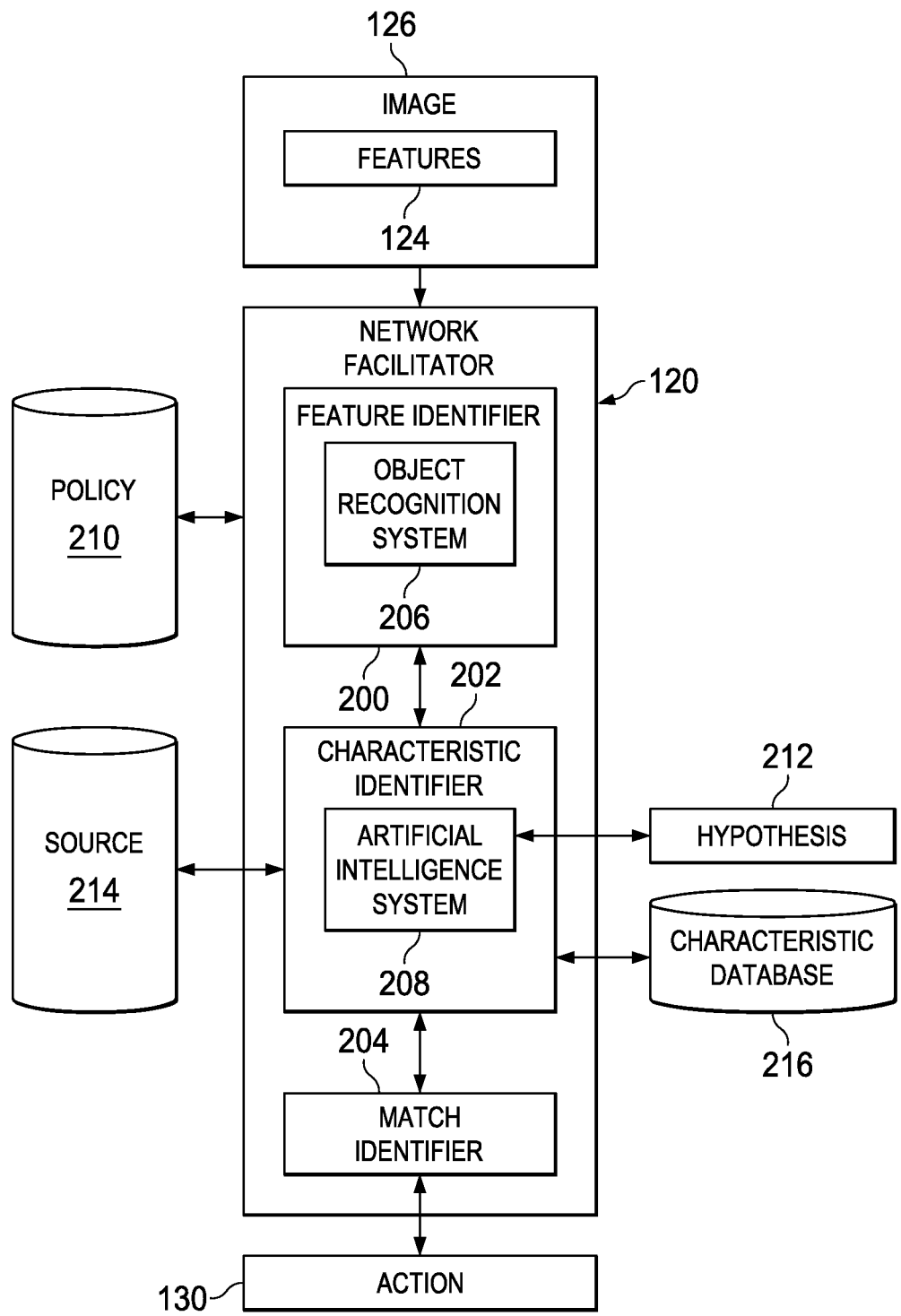
FIG. 2 is an illustration of a block diagram of a network facilitator in accordance with an illustrative embodiment.

Turning to FIG. 2, an illustration of a block diagram of a network facilitator is depicted in accordance with an illustrative embodiment. In this illustrative example, components that may be used to implement network facilitator 120 are shown.

Network facilitator 120 may include a number of different components. For example, network facilitator 120 may include feature identifier 200, characteristic identifier 202, and match identifier 204.

In the illustrative example, feature identifier 200 receives image 126 for processing. As depicted, feature identifier 200 identifies the group of features 124 in image 126.

Feature identifier 200 includes object recognition system 206. As depicted, object recognition system 206 includes one or more object recognition processes that are selected to identify the group of features 124 in image 126. These processes may include object recognition algorithms that rely on matching, learning, pattern recognition, or other suitable techniques.

In the illustrative example, characteristic identifier 202 identifies characteristic 128 from the group of features 124 identified in image 126. As depicted, characteristic identifier 202 may implement processes that identify characteristics about person 114 based on the group of features 124. In this particular example, image 126 is an image obtained from person 114.

In one illustrative example, characteristic identifier 202 includes artificial intelligence system 208 that is designed to identify characteristic 128 from the group of features 124. Artificial intelligence system 208 may be implemented using at least one of an expert system, a Bayesian network, a neural network, or other types of artificial intelligence architecture or processes.

In this illustrative example, characteristic identifier 202 may use policy 210 in place of or in addition to artificial intelligence system 208. Policy 210 is a group of rules and may also include data for identifying characteristic 128 from the group of features 124 identified in image 126.

For example, policy 210 may include rules on identifying colleges, sports teams, companies, charities, and other organizations. These rules in policy 210 specify what trademarks or logos are associated with particular organizations. For example, policy 210 may be applied to a feature such as a logo on a shirt worn by person 114 in image 126. The identification of a particular organization may form characteristic 128.

For example, person 114 may wear a cap in image 126 with a symbol of a mascot for a college attended by person 114. The symbol may be used to identify the college attended by person 114.

As another example, characteristic identifier 202 may use policy 210 to identify a prior company at which person 114 worked at in the past. For example, person 114 may wear a shirt in image 126 with a logo for Company X.

Additionally, policy 210 may also be used to identify the organizations based on objects that may be associated with the organizations. For example, a particular company may be identified through a building in image 126 that is the headquarters for the company. In another example, a college may be identified from a building on the campus of the college found in image 126.

In one illustrative example, characteristic identifier 202 generates hypothesis 212 for characteristic 128 as part of identifying characteristic 128. Hypothesis 212 is a theory or probability that characteristic 128 is correctly identified.

With hypothesis 212, characteristic identifier 202 may verify hypothesis 212 for characteristic 128. This verification may be performed by accessing source 214. Source 214 may be selected from at least one of a database, a social network, an alumni database, a college database, a team roster, an online directory, a website, a person, or some other suitable source.

For example, characteristic identifier 202 forms hypothesis 212 that person 114 attended College X. Characteristic identifier 202 may then verify that person 114 attended College X. For example, characteristic identifier 202 may access source 214 in the form of an alumni or college database to determine whether person 114 attended College X after identifying College X as being a potential characteristic to form characteristic 128 for person 114 from the group of features 124 identified in image 126.

As another example, characteristic identifier 202 may form hypothesis 212 that person 114 had worked for Company X. Hypothesis 212 may be verified by characteristic identifier 202 accessing source 214. For example, characteristic identifier 202 may access another social network to which person 114 also belongs to in verifying whether person 114 had previously worked for Company X. When hypothesis 212 is verified, then characteristic 128 is finalized as being identified as a characteristic for person 114.

In one illustrative example, the group of characteristics 132 identified by characteristic identifier 202 may be added to the profile page for person 114. In this manner, the profile page for person 114 may be made more complete.

In another illustrative example, characteristics 132 may not be added to profile pages 104. For example, person 114 may wish to have characteristic 128 identified from image 126 kept as private and not shown or made available to others.

With this situation, characteristic 128 may be stored in characteristic database 216. In this example, characteristic database 216 may be used as a repository for characteristics used to facilitate networking 122 without adding those characteristics to profile pages 104.

As depicted, match identifier 204 identifies a set of people 106 that have characteristic 128. In other words, set of people 106 and person 114 all have characteristic 128. This identification may be made by searching at least one of profile pages 104 or characteristic database 216 to determine whether any of people 106 have characteristic 128 in common with person 114.

Based on identifying set of people 106, match identifier 204 performs action 130. In this manner, network facilitator 120 aides in facilitating networking 122 between people 106 in social network 102.

The illustration of social network environment 100 and the different components in social network environment 100 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, network facilitator 120 may be used to facilitate networking 122 between people 106, organization 110, and people in another organization. In yet another illustrative example, network facilitator 120 may be used to facilitate networking between people 106 when processing images for purposes other than profile pages 104. For example, network facilitator 120 may process images for a company directory.

With reference next to FIGS. 3-6, illustrations of images including features are depicted in accordance with an illustrative embodiment. These figures are examples of different types of images that may be processed by feature identifier 200 in network facilitator 120 in FIG. 2 to identify a group of features 124. The features identified in these images may be used to identify characteristics for a person. The identified characteristics may then be used to facilitate networking between people 106 in social network 102.

Figure 3:
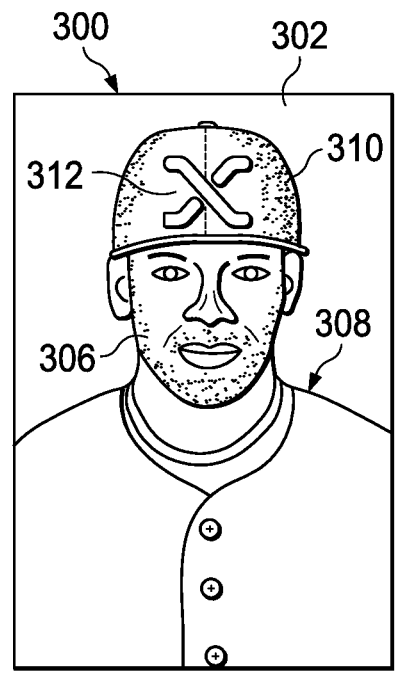
FIG. 3 is an illustration of an image in the form of a profile picture in accordance with an illustrative embodiment.

With reference to FIG. 3, an illustration of an image in the form of a profile picture is depicted in accordance with an illustrative embodiment. In this figure, image 300 takes the form of profile picture 302. In this example, profile picture 302 is a photograph of face 306 of person 308 wearing cap 310 with logo 312 for College X. Person 308 in image 300 is the person for whom the characteristic is identified in this depicted example.

As illustrated, face 306, person 308, cap 310, and logo 312 are features in image 300. These features are examples of features that may be identified by feature identifier 200 in FIG. 2.

As depicted, logo 312 is used to identify a characteristic for the person. In particular, a hypothesis is generated that person 308 attended College X. In the illustrative example, this hypothesis for the characteristic may be verified to form a characteristic for person 304. For example, college databases, alumni databases, or other sources may be accessed to determine whether person 304 attended College X to verify that the hypothesis is correct for the characteristic that person 308 attended College X.

In this illustrative example, if the hypothesis is incorrect, then another hypothesis may be formed. The second hypothesis may be, for example, that the person is a fan of College X.

Figure 4:
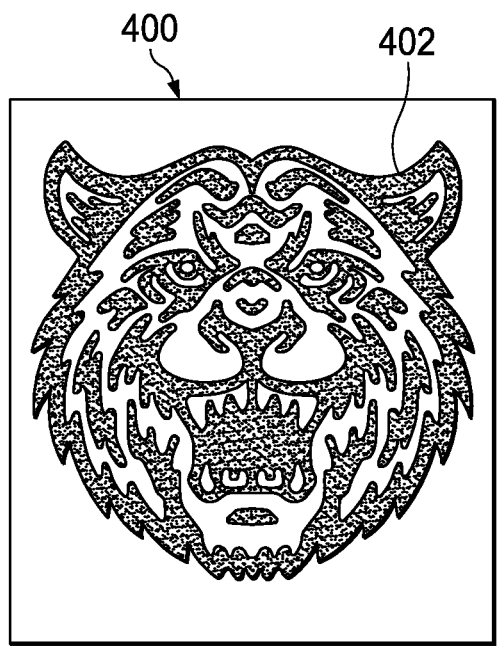
FIG. 4 is an illustration of an image in the form of a profile picture in accordance with an illustrative embodiment.

With reference now to FIG. 4, an illustration of an image in the form of a profile picture is depicted in accordance with an illustrative embodiment. In this illustrative example, image 400 is logo 402 for sports team Y. Logo 402 is a feature identified in image 400. A hypothesis may be generated that the person is a fan of sports team Y. In this illustrative example, a verification of the hypothesis for the characteristic is made by sending a message to the person asking whether the person is a fan of sports team Y.

Figure 5:
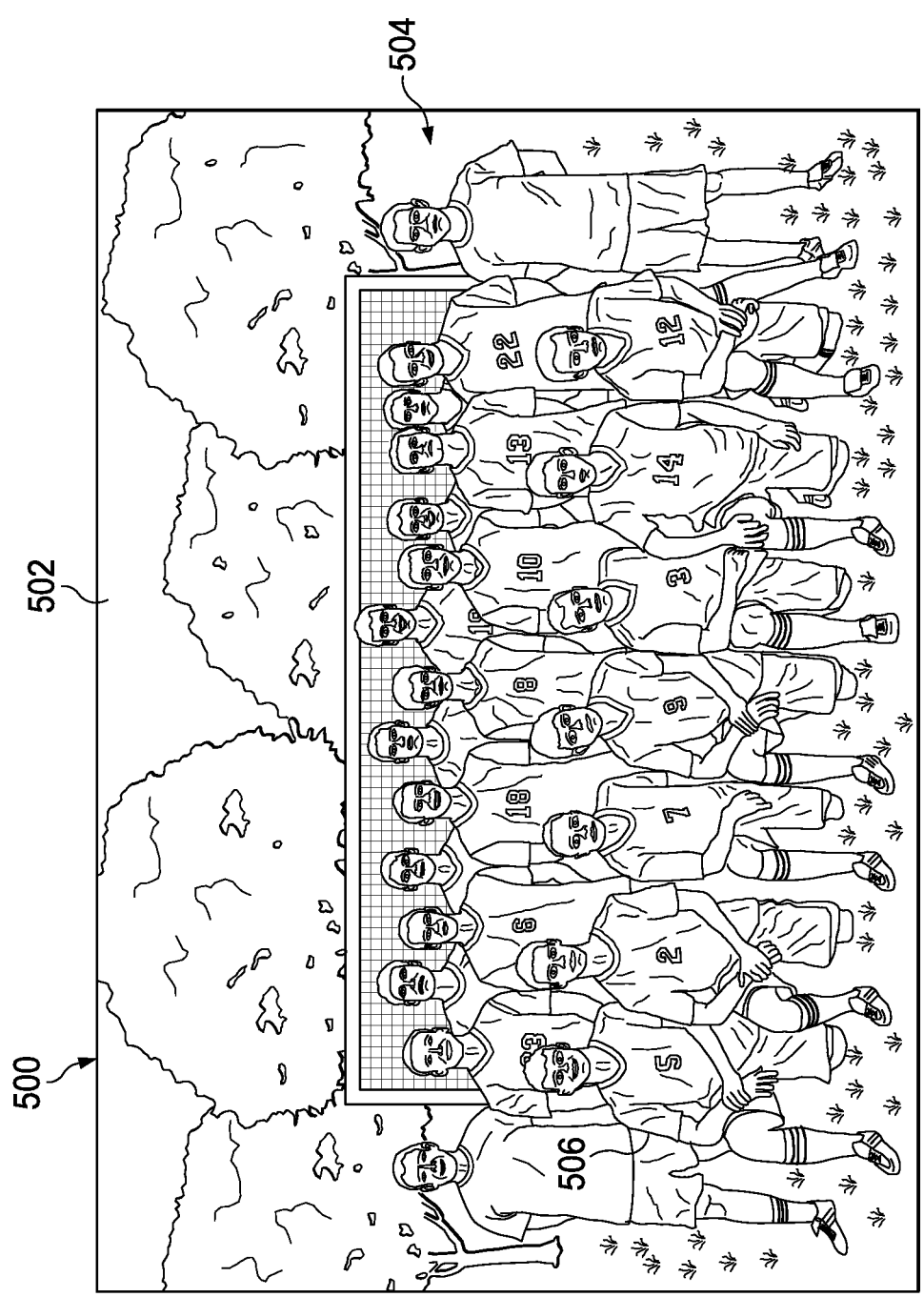
FIG. 5 is an illustration of an image in the form of a background picture in accordance with an illustrative embodiment.

With reference to FIG. 5, an illustration of an image in the form of a background picture is depicted in accordance with an illustrative embodiment. In this illustrative example, image 500 is background picture 502. As depicted, image 500 is a picture of soccer team 504.

Person 506 is in soccer team 504 in image 500. As depicted, person 506 in image 500 is the person for which characteristics are identified.

In this illustrative example, a hypothesis is formed in which person 506 is a member of soccer team 504. The hypothesis for the characteristics in this example is that person 506 is a soccer player on soccer team 504 and has an interest in soccer.

The hypothesis that person 506 is a member of soccer team 504 is verified by accessing a source. For example, verification may be made by checking a database of rosters for soccer team 504. The hypothesis that person 506 is a soccer fan may be assumed to be correct. If person 506 is not a member of soccer team 504, the verification of the second hypothesis may be made by sending a message to the person.

Figure 6:
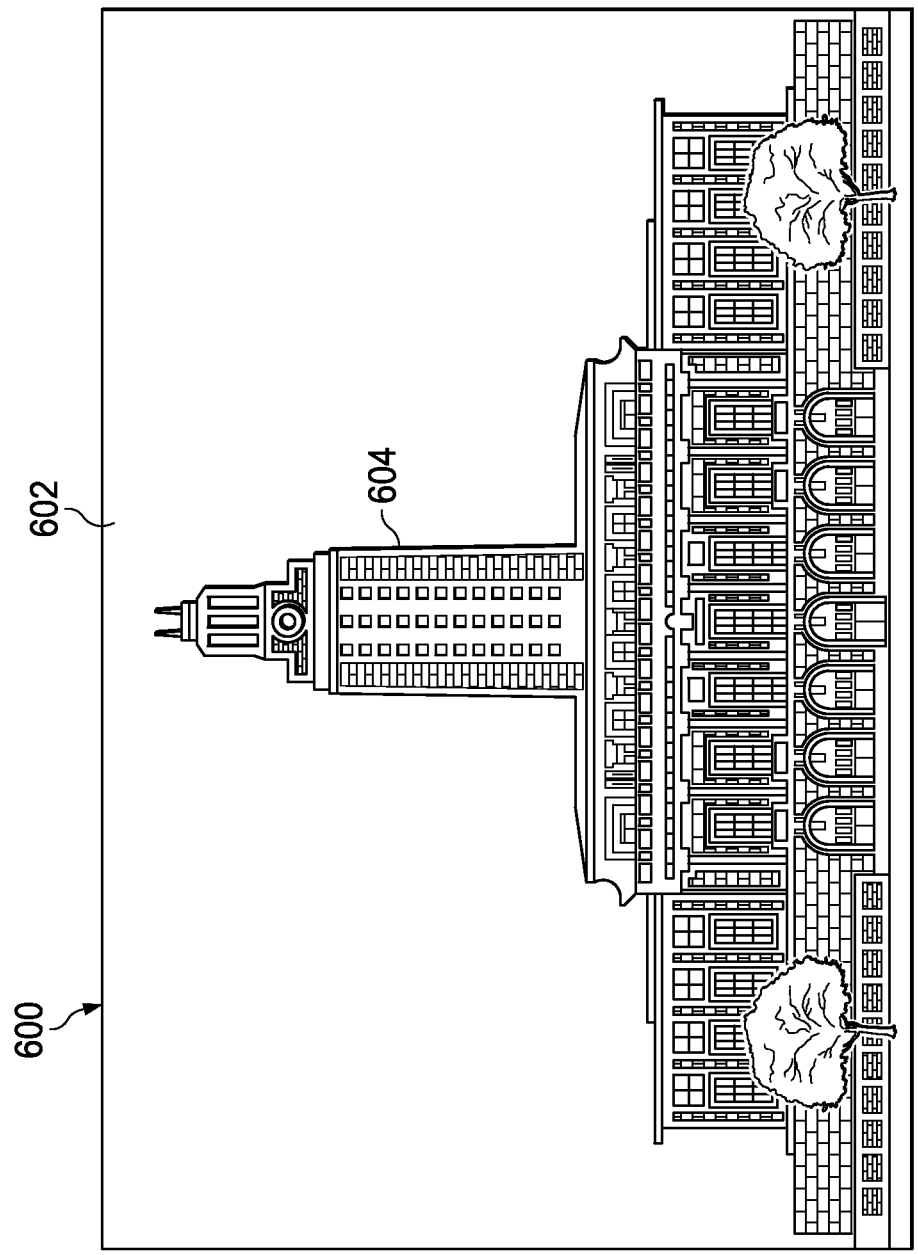
FIG. 6 is an illustration of an image in the form of a background picture in accordance with an illustrative embodiment.

Turning now to FIG. 6, an illustration of an image in the form of a background picture is depicted in accordance with an illustrative embodiment. In this example, image 600 is background image 602. Image 600 includes university building 604 for University Z as a feature.

The identification of university building 604 may be used to form a hypothesis that the person attended University Z. This hypothesis may be verified by accessing a source such as an alumni database. A current student database may be accessed if the person currently attends University Z.

The illustrations of images in FIGS. 3-6 are only meant as examples of some images that may be processed for identifying features from which characteristics may be identified. In other illustrative examples, other images may be analyzed. The images may be images other than profile pictures or background pictures. For example, the images analyzed to identify features for identifying characteristics may be pictures uploaded for an album for the person.

Figure 7:
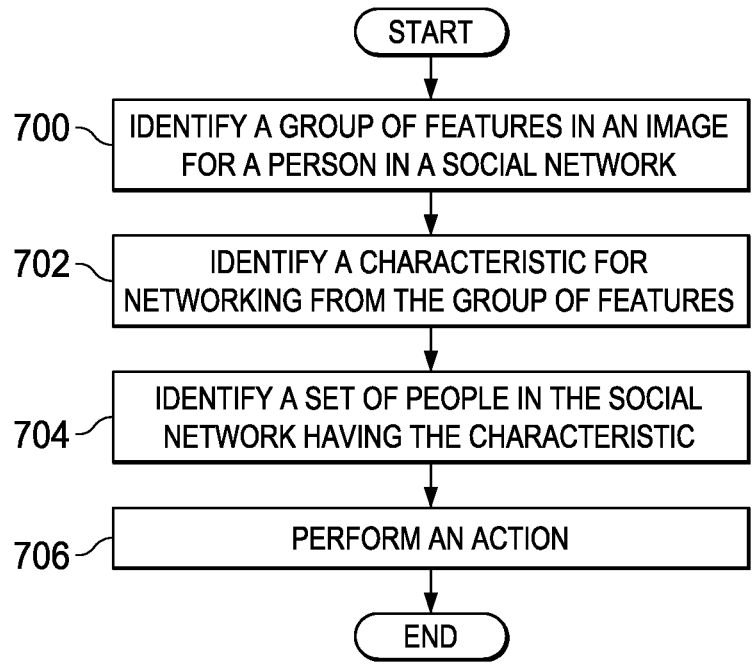
FIG. 7 is an illustration of a flowchart of a process for facilitating networking in a social network in accordance with an illustrative embodiment.

Turning to FIG. 7, an illustration of a flowchart of a process for facilitating networking in a social network is depicted in accordance with an illustrative embodiment. The process illustrated in FIG. 7 may be implemented in social network environment 100 in FIG. 1. In particular, the process may be implemented in network facilitator 120 in social network environment 100 in FIG. 1.

The process begins by identifying a group of features in an image for a person in a social network (step 700). The process identifies a characteristic for networking from the group of features (step 702).

The process identifies a set of people in the social network having the characteristic (step 704). The process performs an action (step 706), with the process terminating thereafter. In this manner, the process enables networking in the social network with respect to the person and the set of people in the social network having the characteristic.

Figure 8:
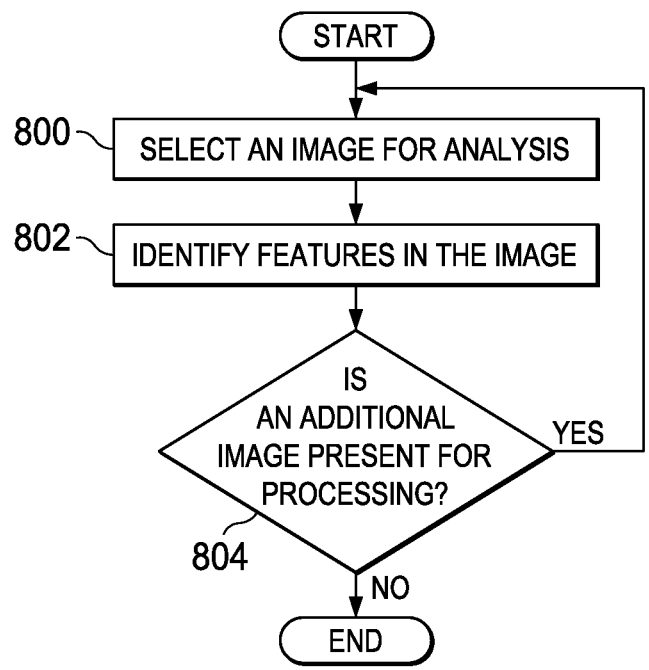
FIG. 8 is an illustration of a flowchart of a process for identifying features in an image in accordance with an illustrative embodiment.

Turning now to FIG. 8, an illustration of a flowchart of a process for identifying features in an image is depicted in accordance with an illustrative embodiment. The process illustrated in FIG. 8 may be implemented in feature identifier 200 in network facilitator 120 in FIG. 2.

The process begins by selecting an image for analysis (step 800). Next, the process identifies features in the image (step 802).

A determination is then made as to whether an additional image is present for processing (step 804). If an additional image is present, the process returns to operation that 800. Otherwise, the process terminates.

Figure 9:
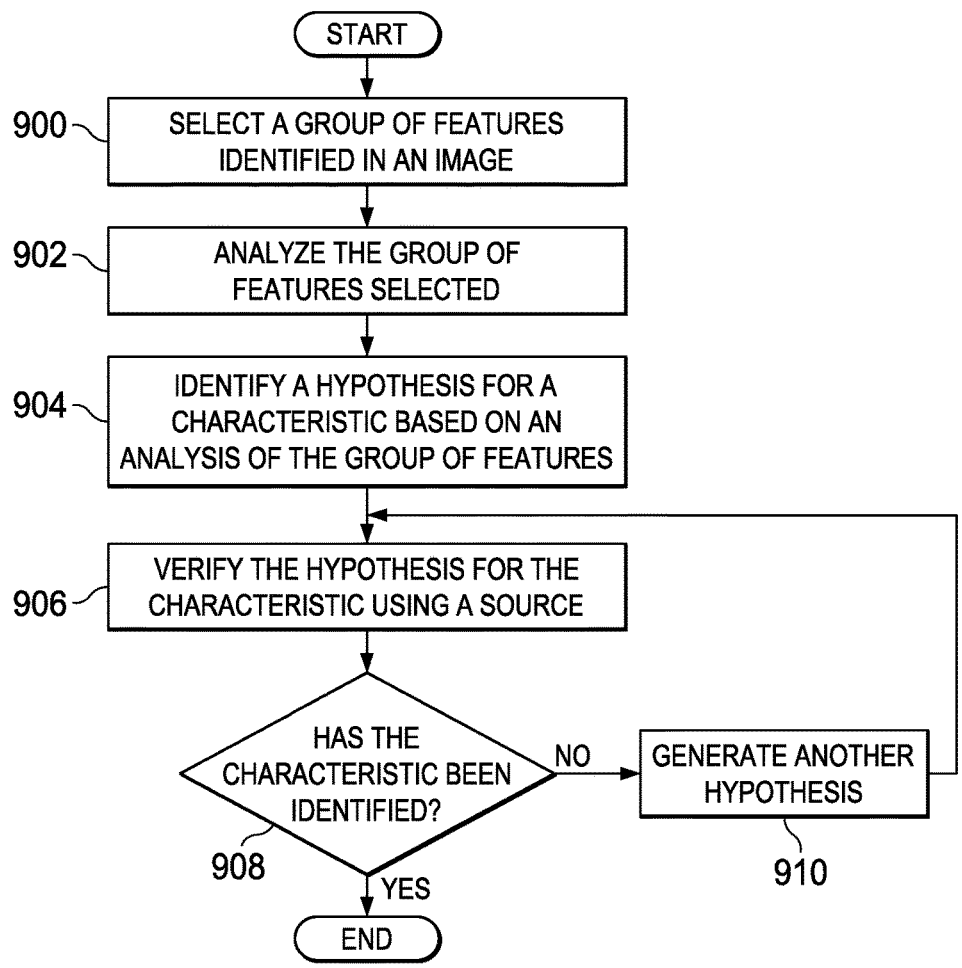
FIG. 9 is an illustration of a flowchart of a process for identifying characteristics from features in accordance with an illustrative embodiment.

Turning now to FIG. 9, an illustration of a flowchart of a process for identifying characteristics from features is depicted in accordance with an illustrative embodiment. The process illustrated in FIG. 9 may be implemented in characteristic identifier 202 in network facilitator 120 in FIG. 2.

The process begins by selecting a group of features identified in an image (step 900). The group of features selected in step 900 may be some or all of the features identified in the image. The process then analyzes the group of features selected (step 902). In step 902, the feature may be identified.

For example, whether the group of features includes at least one of a logo, a person, a building, or some other type of feature may be identified in step 902. Additionally, color schemes and other information also may be identified for the features selected for analysis.

The process identifies a hypothesis for a characteristic based on an analysis of the group of features (step 904). The hypothesis for the characteristic is verified using a source (step 906). The verification may be made by accessing a source such as a database, a network, an online directory, or other sources of information. In still other illustrative examples, the verification may be made by sending a request for verification to a person with knowledge of the particular characteristic.

A determination is made as to whether the characteristic has been verified (step 908). If the characteristic has been verified, the process terminates. Otherwise, another hypothesis is generated (step 910), with the process then returning to step 906.

Figure 10:
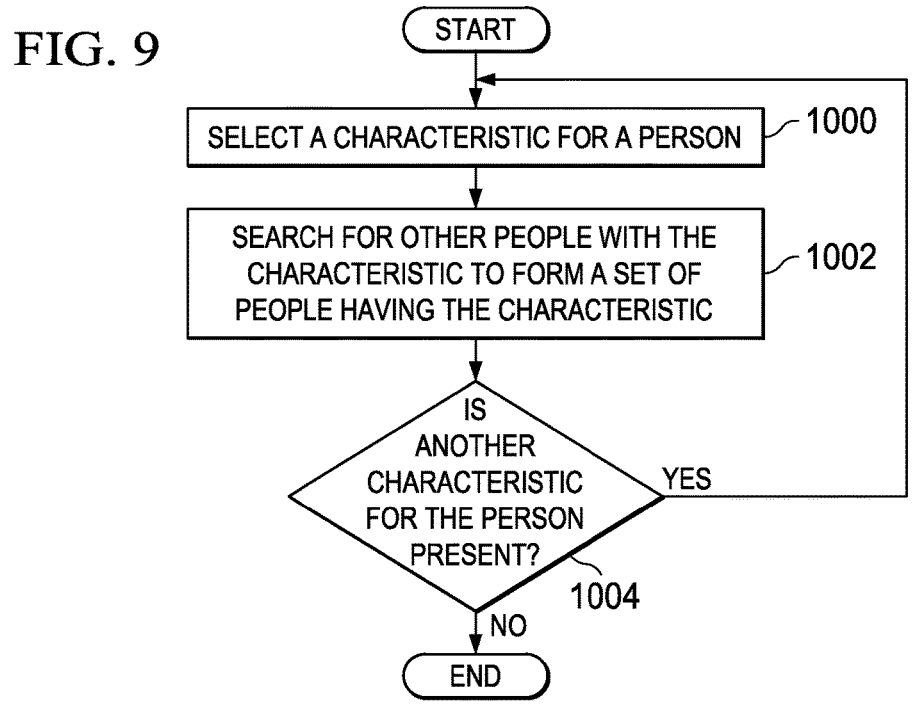
FIG. 10 is an illustration of a flowchart of a process for identifying characteristics from features in accordance with an illustrative embodiment.

Turning now to FIG. 10, an illustration of a flowchart of a process for identifying characteristics from features is depicted in accordance with an illustrative embodiment. The process illustrated in FIG. 10 may be implemented in match identifier 204 in network facilitator 120 in FIG. 2.

The process begins by selecting a characteristic for a person (step 1000). The process then searches for other people with the characteristic to form a set of people having the characteristic (step 1002).

A determination is then made as to whether another characteristic is present for the person (step 1004). If another characteristic is present, the process returns to step 1000. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, step 908 and step 910 may be omitted. In some illustrative examples. In another example, the flowchart in FIG. 10 may be implemented to search for multiple characteristics instead of a single characteristic. In another example, step 910 may be omitted such that another hypothesis for the feature is not generated if the hypothesis for the characteristic is not verified.

Figure 11:
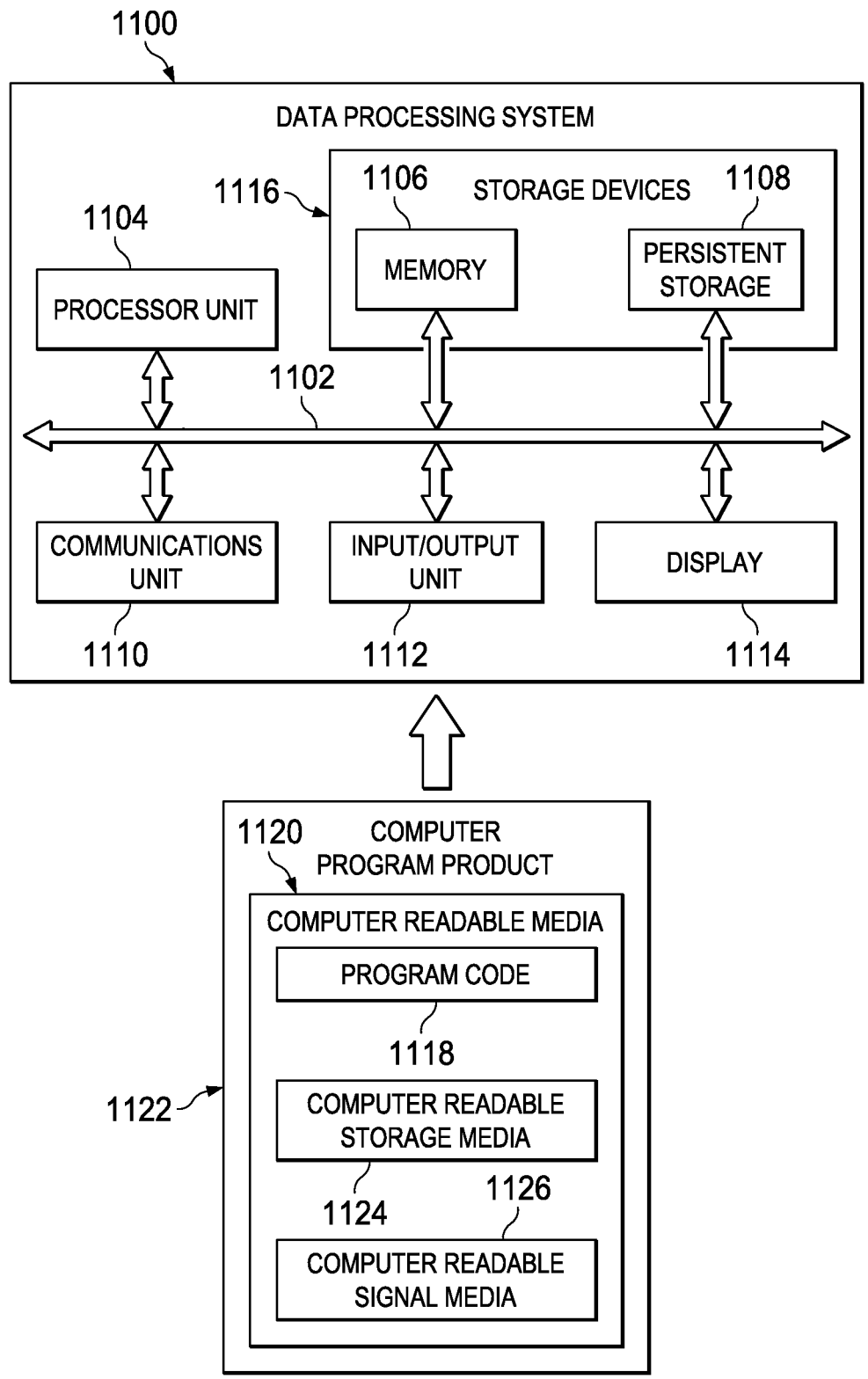
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more computers in computer system 123 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118. Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, the illustrative examples provide a method and apparatus for facilitating networking in a social network. In particular, in illustrative examples, may be used to overcome the technical problem of insufficient information in a profile of a person in a social network in which the insufficient information reduces the ability to establish contacts in the social network.

A network facilitator in a computer system uses images to identify characteristics from features in an image. These characteristics may be used to match up people in a social network. An action may be taken with respect to people with the same characteristics. These actions may have a technical effect of facilitating networking. In this manner, newer members of an organization may meet other members of the organization that have the same characteristics. This type of networking may facilitate the integration of newer members in organizations as well as making current organizations more cohesive.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   a computer system:
   identifying a social network profile for a person based on:
   the social network profile having insufficient information for the person to establish contacts in a social network; and
   the person being a newer member than other members of the social network; and
   based on the social network profile being identified as having insufficient information:
   obtaining an image from the person, wherein:
   the image is obtained from a source external to the social network; and
   the obtaining is related to purposes other than including the image in the social network profile;
   performing an object recognition process that applies a set of object recognition algorithms to the image to identify a group of features for the person;
   first identifying a characteristic for networking among a set of people in the social network from the group of features, wherein the characteristic corresponds to a feature of the group of features in common with people of the set of people, and wherein first identifying comprises:
   applying a set of artificial intelligence processes to the group of features to identify a hypothesis for the characteristic, wherein the hypothesis is a probability that the characteristic is correctly identified; and
   verifying the hypothesis for the characteristic by finding the person in a data source, wherein the data source comprises a group of people having the characteristic, and wherein the hypothesis is accepted for the person being found in the data source, or the hypothesis is rejected for the person not being found in the data source;
   second identifying the set of people in the social network having the characteristic;
   sending a suggestion to the set of people to establish a connection with the person, thereby enabling networking in the social network with respect to the person and the set of people in the social network having the characteristic;
   connecting, based on acceptance of the suggestion, the person with other members of the social network that share the characteristic, wherein:
   the social network profile does not comprise the characteristic; and
   the insufficient information comprises the characteristic; and
   after connecting, adding the characteristic to the social network profile based on the person indicating whether the characteristic is to be kept private or made available to the other members,
   wherein the data source is external to the social network, and wherein verifying the hypothesis using the data source to identify the characteristic further comprises the computer system:
   accessing the data source external to the social network, wherein the data source comprises at least one of an external database, an alumni database, a college database, a team roster, an online directory, or a website; and
   verifying the hypothesis in response to identifying the person in the data source.

2. The method of claim 1 further comprising the computer system:
   third identifying a first plurality of characteristics from the group of features, wherein the first plurality of characteristics and the characteristic comprise a second plurality of characteristics, and second identifying comprises identification of the set of people in the social network having the second plurality of characteristics.

3. The method of claim 1, wherein enabling networking comprises selecting a team based on the person and the set of people.

4. The method of claim 1, wherein enabling networking comprises sending a message to the set of people indicating that the person is in the social network and has the characteristic in common with the set of people.

5. The method of claim 1, wherein the group of features comprises at least one of a first person, a face of a second person, a car, a stadium, a building, an animal, a piece of equipment, a piece of apparel, a piece of furniture, an aircraft, a tree, a mountain, a spacecraft, a planet, an object, a symbol, or a logo.

6. The method of claim 1, wherein the image is selected from one of a profile picture or a background picture.

7. A computer system comprising:
at least one hardware processor; and
a network facilitator in communication with the hardware processor, the network facilitator configured to:
perform an object recognition process that applies a set of object recognition algorithms to an image to identify a group of features for a person, wherein:
the image is obtained from a source external to a social network; and
the image is obtained for purposes other than inclusion of the image in a user profile;
first identify a characteristic from the group of features, wherein the characteristic is selected for networking among a plurality of people in the social network, wherein the characteristic corresponds to a feature of the group of features in common with people of the plurality of people, and wherein identifying the characteristic for networking comprises applying a set of artificial intelligence processes to the group of features to produce a hypothesis for the characteristic, wherein the set of artificial intelligence processes includes an expert system, a neural network or a Bayesian network, and the hypothesis is a probability that the characteristic is correctly identified, and determining if the person is listed in a data source, wherein the data source is configured to designate a group of people having the characteristic in common, wherein:
presence of a listing of the person in the data source confirms the hypothesis of the characteristic being found in the person; and
absence of the listing of the person in the data source rejects the hypothesis of the characteristic being found in the person;
second identify the plurality of people in the social network having the characteristic;
send a message to the plurality of people, thereby enabling networking in the social network with respect to the person and the plurality of people in the social network; and
add the characteristic to the user profile based on the person indicating whether the characteristic is to be kept private or made available to the plurality of people in the social network,
wherein the data source is external to the social network, and the network facilitator is further configured to access the data source external to the social network, wherein the data source comprises at least one of an external database, an alumni database, a college database, a team roster, an online directory, or a website; and
verify the hypothesis in response to identifying the person in the data source.

8. The computer system of claim 7, wherein the network facilitator is further configured to third identify a first plurality of characteristics from the group of features, wherein the first plurality of characteristics and the characteristic comprise a second plurality of characteristics, and wherein second identification identifies the plurality of people in the social network having the second plurality of characteristics.

9. The computer system of claim 7, wherein the message further comprises a suggestion to the plurality of people to establish a connection with the person.

10. The computer system of claim 7, wherein enabling networking in the social network comprises the network facilitator selecting a team based on the person and the plurality of people.

11. The computer system of claim 7, wherein the message indicates that the person is in the social network and has the characteristic in common with the plurality of people.

12. The computer system of claim 7, wherein the group of features comprises at least one of an identity of a first person, a face of a second person, a car, a stadium, a building, an animal, an article of equipment, an article of apparel, an article of furniture, an aircraft, a tree, a mountain, a spacecraft, a planet, an object, a symbol, or a logo.

13. The computer system of claim 7, wherein the image is selected from one of a profile picture or a background picture.

14. A computer program product comprising:
a computer readable storage medium including instructions for processing a social network profile for a person based on the social network profile having insufficient information for the person to establish contact in a social network, wherein the instructions comprise:
first program code for performing an object recognition process that applies a set of object recognition algorithms to an image to identify a group of features for a person, wherein the image is obtained:
from a source external to the social network; and
for purposes other than including the image in the social network profile;
second program code for identifying a characteristic from the group of features, wherein:
subsequent networking among a set of people in a social network is based on the characteristic;
the characteristic is a feature of the group of features held in common with people of the set of people;
the second program code comprises first instructions for applying a set of artificial intelligence processes to the group of features to identify a first hypothesis for the characteristic;
the first hypothesis is a probability that the characteristic is correctly identified;
the second program code further comprises second instructions for identifying the person in a data source;
the data source comprises a listing of a group of people having the characteristic;
being found in the listing verifies the first hypothesis of the characteristic being found in the person, or not being found in the listing rejects the first hypothesis, where after not being found, the first instructions are repeated to identify a subsequent hypothesis;

the subsequent hypothesis is different than the first hypothesis; and repetition of the first instructions continues until the second instructions verify the subsequent hypothesis;

third program code for identifying the set of people in the social network having the characteristic; and fourth program code for sending a suggestion, thereby enabling networking in the social network with respect to the person and the set of people in the social network having the characteristic, wherein: the social network profile does not comprise the characteristic; and the insufficient information comprises the characteristic and adding the characteristic to the social network profile for the person based on the person indicating whether the characteristic is to be kept private or made available to the plurality of people in the social network, wherein the data source is external to the social network, and wherein the second program code further comprises instructions for:

accessing the data source external to the social network, wherein the data source comprises at least one of an external database, an alumni database, a college database, a team roster, an online directory, or a website; and verifying the first hypothesis or the subsequent hypothesis in response to identifying the person in the data source.

15. The computer program product of claim 14, wherein the instructions further comprise:

fifth program code for identifying a first plurality of characteristics from the group of features in addition to the characteristic, wherein the first plurality of characteristics and the characteristic comprise a second plurality of characteristics, and wherein the third program code further comprises instructions for identifying the set of people in the social network having the second plurality of characteristics.

16. The computer program product of claim 14, wherein the suggestion is sent to the set of people to establish a connection with the person in the social network.

17. The computer program product of claim 14, wherein the fourth program code further comprises instructions for selecting a team based on the person and the set of people.

18. The computer program product of claim 14, wherein the fourth program code further comprises instructions for sending a message to the set of people, the message indicating that the person is in the social network, and that the person has the characteristic in common with the set of people.

19. The method of claim 1, wherein the set of artificial intelligence processes includes at least one of an expert system, a Bayesian network, or a neural network.

20. The computer program product of claim 14, wherein the set of artificial intelligence processes includes an expert system, a neural network or a Bayesian network.

21. The method of claim 2, wherein enabling networking comprises sending a message to the set of people indicating that the person is in the social network and has the characteristic in common with the set of people.

22. The computer system of claim 8, wherein the message indicates that the person is in the social network and has the characteristic in common with the plurality of people.

23. The computer program product of claim 15, wherein the fourth program code further comprises instructions for sending a message to the set of people, the message indicating that the person is in the social network, and that the person has the characteristic in common with the set of people.

* * * * *